(12) United States Patent
Hikazudani et al.

(10) Patent No.: US 10,946,366 B2
(45) Date of Patent: Mar. 16, 2021

(54) HONEYCOMB STRUCTURE AND CATALYST FOR CLEANING EXHAUST GAS USING SAME, AND METHOD FOR PRODUCING CATALYST FOR CLEANING EXHAUST GAS

(71) Applicant: Hitachi Zosen Corporation, Osaka (JP)

(72) Inventors: Susumu Hikazudani, Osaka (JP); Emi Shono, Osaka (JP); Kana Shimizu, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 74 days.

(21) Appl. No.: 16/054,146

(22) Filed: Aug. 3, 2018

(65) Prior Publication Data

US 2018/0345258 A1 Dec. 6, 2018

Related U.S. Application Data

(62) Division of application No. 15/129,497, filed as application No. PCT/JP2015/059606 on Mar. 27, 2015, now abandoned.

(30) Foreign Application Priority Data

Mar. 27, 2014 (JP) .................................. 2014-065986

(51) Int. Cl.
*B01J 29/69* (2006.01)
*B01J 35/04* (2006.01)
(Continued)

(52) U.S. Cl.
CPC .............. *B01J 29/69* (2013.01); *B01D 53/88* (2013.01); *B01D 53/9418* (2013.01);
(Continued)

(58) Field of Classification Search
None
See application file for complete search history.

(56) References Cited

U.S. PATENT DOCUMENTS 4,170,629 A 10/1979 Betz
5,055,029 A * 10/1991 Avidan .................... F23C 10/10
110/342
(Continued)

FOREIGN PATENT DOCUMENTS

EP 1726698 A1 11/2006
EP 2818243 A1 12/2014
(Continued)

OTHER PUBLICATIONS

Official communication dated Aug. 27, 2019, from the EPO transmitting the extended European Search Report in the corresponding EP patent application 19170422.0.
(Continued)

*Primary Examiner* — Colin W. Slifka
(74) *Attorney, Agent, or Firm* — Locke Lord LLP; James E. Armstrong, IV; Nicholas J. Di Ceglie, Jr.

(57) ABSTRACT

The present invention addresses the problem and purpose of providing a honeycomb structure that has a sufficiently high strength and is excellent in endurance, and a catalyst for cleaning an exhaust gas using the same that is excellent in resistance to sulfur oxide (SOX). The honeycomb structure of the present invention is one consists of a flat inorganic fiber sheet comprising an inorganic fiber sheet having supported thereon an inorganic binder and zeolite, and a corrugated inorganic fiber sheet comprising an inorganic fiber sheet having supported thereon the same inorganic binder and zeolite, which are alternately combined with each other,
(Continued)

wherein it is characterized in that the zeolite has a particle diameter (i.e., a median particle diameter, D50) of from 0.5 to 10.0 μm.

11 Claims, 1 Drawing Sheet

(51) Int. Cl.

| | | |
|---|---|---|
| B01J 29/65 | (2006.01) | |
| B01J 35/02 | (2006.01) | |
| B01J 37/02 | (2006.01) | |
| B01D 53/88 | (2006.01) | |
| B01D 53/94 | (2006.01) | |
| B01J 29/70 | (2006.01) | |
| F01N 3/28 | (2006.01) | |

(52) U.S. Cl.
CPC .............. *B01J 29/65* (2013.01); *B01J 29/70* (2013.01); *B01J 35/023* (2013.01); *B01J 35/026* (2013.01); *B01J 35/04* (2013.01); *B01J 37/0215* (2013.01); *B01J 37/0246* (2013.01); *F01N 3/2835* (2013.01); *F01N 3/2842* (2013.01); *B01D 2251/21* (2013.01); *B01D 2255/2092* (2013.01); *B01D 2255/2096* (2013.01); *B01D 2255/20707* (2013.01); *B01D 2255/20715* (2013.01); *B01D 2255/30* (2013.01); *B01D 2255/50* (2013.01); *B01D 2255/9202* (2013.01); *B01D 2258/012* (2013.01); *F01N 2330/10* (2013.01); *F01N 2370/04* (2013.01)

(56) References Cited

U.S. PATENT DOCUMENTS

| | | |
|---|---|---|
| 5,194,414 A | 3/1993 | Kuma |
| 2003/0165638 A1 | 9/2003 | Louks et al. |
| 2009/0286678 A1* | 11/2009 | Hagemeyer .......... C01G 39/006 502/304 |

FOREIGN PATENT DOCUMENTS

| | | |
|---|---|---|
| EP | 3103550 A1 | 12/2016 |
| JP | 04-215854 A | 8/1992 |
| JP | 05-064745 A | 3/1993 |
| JP | 07-124475 A | 5/1995 |
| JP | 08-011251 A | 1/1996 |
| JP | 08-266866 A | 10/1996 |
| JP | 2854321 B2 | 2/1999 |
| JP | 11-188238 A | 7/1999 |
| JP | 2004-261754 A | 9/2004 |
| JP | 2004-358454 A | 12/2004 |
| JP | 2006-239917 A | 9/2006 |
| JP | 2013-226545 A | 11/2013 |
| WO | 2013/125137 A1 | 8/2013 |

OTHER PUBLICATIONS

International Search Report dated Jun. 23, 2015, issued for PCT/JP2015/059606.

D. E. Sparks et al., "Bi2O3/Al2O3 catalysts for the selective reduction of NO with hydrocarbons in lean conditions", Applied Catalysis B: Environmental, vol. 65, 2006, pp. 44-54. (cited in the Sep. 21, 2017 EP Search Report).

Supplementary European Search Report dated Sep. 21, 2017, issued for the European patent application No. EP 15768958.9.

* cited by examiner

HONEYCOMB STRUCTURE AND CATALYST FOR CLEANING EXHAUST GAS USING SAME, AND METHOD FOR PRODUCING CATALYST FOR CLEANING EXHAUST GAS

This Application is a Division of application Ser. No. 15/129,497 filed on Sep. 27, 2016. Application PCT/JP2015/059606 claims priority from Application 2014-065986 filed on Mar. 27, 2014 in Japan. The entire contents of these applications are incorporated herein by reference in their entirety.

TECHNICAL FIELD

The present invention relates to a honeycomb structure, which are used, for example, in a cleaning method for removing a nitrogen oxide (NOx) from a combustion exhaust gas, a catalyst for cleaning an exhaust gas using the same, and a method for producing a catalyst for cleaning an exhaust gas.

BACKGROUND ART

For example, an exhaust gas discharged from a marine vessel engine has a high sulfur oxide (SOx) concentration and a high nitrogen oxide (NOx) concentration in the exhaust gas due to the use of a C fuel as a fuel, and ammonia ($NH_3$) or the like used as a reducing agent for a denitration reaction is reacted with a sulfur oxide (SOx) to form ammonium sulfate. The exhaust gas from the marine vessel engine has a temperature of 300° C. or less, and generally approximately 250° C., and under the condition, ammonium sulfate is generated in the exhaust gas to fail to retain the stable catalyst capability.

Patent Literature 1 below discloses an exhaust gas cleaning method using a catalyst having a denitration capability removing a nitrogen oxide (NOx) even in an exhaust gas containing a sulfur oxide, and describes an exhaust gas cleaning method for reducing and removing a nitrogen oxide NOx in an exhaust gas in such a manner that β-zeolite having supported thereon iron, cobalt, silver, molybdenum, or tungsten is used as the denitration catalyst, and an oxygen excessive exhaust gas is made in contact therewith in the presence of ethanol and/or isopropyl alcohol as a reducing agent.

Patent Literature 2 below describes an exhaust gas cleaning method for reducing and removing a nitrogen oxide NOx in an exhaust gas in such a manner that proton-type β-zeolite is used as a catalyst, and an oxygen excessive exhaust gas is made in contact therewith in the presence of ethanol and/or isopropyl alcohol as a reducing agent.

Patent Literature 3 below describes an exhaust gas cleaning method using ZSM-5 type zeolite having supported thereon cobalt, which is produced in such a manner that Na-ZSM-5 type zeolite or H-ZSM-5 type zeolite having an $SiO_2/Al_2O_3$ ratio of 27 or more and 100 or less is used as a catalyst support, and the catalyst support is immersed in an aqueous solution of cobalt salt (such as nitrate, acetate, or chloride of cobalt) to perform ion exchange between the Na (or H) present on the catalyst support and Co at an ion exchange rate of from 40 to 100%, as a denitration catalyst, and a liquefied petroleum gas containing propane and butane in the composition thereof as a reducing agent.

However, the exhaust gas cleaning methods by the reduction and removing using the denitration catalyst described in Patent Literatures 1 to 3 have a problem that the reaction temperature of the exhaust gas cleaning is approximately from 300 to 500° C., which is higher than the temperature of the exhaust gas from the marine vessel engine.

Under the circumstances, the present applicant have proposed in Patent Literature 4 below a method for cleaning a combustion exhaust gas that is capable of effectively decreasing a nitrogen oxide from a combustion exhaust gas discharged, for example, from a marine vessel engine, having a high concentration of a nitrogen oxide (NOx) and a sulfur oxide (SOx) present therein, and having a low exhaust gas temperature of 300° C. or less.

In the method for cleaning a combustion exhaust gas disclosed in Patent Literature 4, a substrate for producing a honeycomb structure is produced by performing a step of coating a slurry formed of zeolite, water, and a silica sol on a glass fiber sheet, and then a honeycomb structure is produced by performing a step of corrugating the sodium type zeolite-supported substrate to provide a corrugated glass fiber sheet substrate, a step of processing the substrate to a flat glass fiber sheet to provide a flat glass fiber sheet substrate, and a step of laminating the corrugated glass fiber sheet substrate and the flat glass fiber sheet substrate alternately. The zeolite-supported honeycomb structure produced by the aforementioned method is subjected to a step of performing ion exchange with a catalyst metal, so as to produce a honeycomb denitration catalyst.

Patent Literature 1: JP-A-2004-358454
Patent Literature 2: JP-A-2004-261754
Patent Literature 3: JP-A-11-188238
Patent Literature 4: JP-A-2013-226545

DISCLOSURE OF INVENTION

Technical Problem

However, the method described in Patent Literature 4 has a problem that the property of the zeolite that is easily solidified is unclear in the case where the zeolite-containing slurry is coated on the glass fiber sheet, and it is difficult to produce a honeycomb structure that has a sufficiently high strength and is excellent in endurance property.

Furthermore, there is a problem that it is difficult to produce a denitration catalyst that is excellent in resistance to a sulfur oxide (SOx).

An object of the present invention is to solve the problems in the prior art described above, and to provide a honeycomb structure that has a sufficiently high strength and is excellent in endurance property, and a catalyst for cleaning an exhaust gas using the same that is excellent in resistance to a sulfur oxide (SOx).

Solution to Problem

As a result of earnest investigations accumulated by the inventors, it has been found that in the production of a honeycomb structure by coating a zeolite-containing slurry on an inorganic fiber sheet, zeolite having a large particle diameter is not flocculated to fail to produce a honeycomb structure having a high strength, and as for the zeolite properties (particle diameter) in the production of a honeycomb structure, the use of zeolite having a prescribed particle diameter enables the production of a honeycomb structure having a sufficient strength, and thus the present invention has been completed.

For achieving the aforementioned objects, the invention of a honeycomb structure of claim 1 is a honeycomb structure consisting of a flat inorganic fiber sheet comprising an inorganic fiber sheet having supported thereon an inorganic binder and zeolite, and a corrugated inorganic fiber sheet comprising an inorganic fiber sheet having supported thereon the same inorganic binder and zeolite, which are alternately combined with each other, wherein it is characterized in that the zeolite has a particle diameter (i.e., a median particle diameter, D50) of from 0.5 to 10.0 µm.

The particle diameter of the zeolite herein means a particle diameter corresponding to 50% in the volume-based cumulative particle size distribution (i.e., a median particle diameter, D50) measured by a laser diffraction method. The measurement of sample is performed after dispersing in water. At this time, for making a state where the particles are sufficiently dispersed in water, the particles are dispersed with an ultrasonic homogenizer, and the measurement result is recorded after confirming that the results of the particle diameter distribution is not fluctuated.

In the honeycomb structure described above, the inorganic fiber sheet is preferably a glass fiber sheet.

In the honeycomb structure described above, the inorganic binder is preferably formed of zirconia, alumina, silica, silica-alumina, or titania, and the inorganic binder is particularly preferably formed of zirconia or alumina.

The invention of claim 3 is a catalyst for cleaning an exhaust gas using a honeycomb structure, wherein it is characterized in that it contains a denitration catalyst component that is supported on the zeolite of the aforementioned honeycomb structure.

In the catalyst for cleaning an exhaust gas using the honeycomb structure described above, the inorganic binder is preferably formed of zirconia or alumina.

In the catalyst for cleaning an exhaust gas using a honeycomb structure, the denitration catalyst component is preferably bismuth.

The present invention also relates to a method for producing the catalyst for cleaning an exhaust gas having bismuth as the denitration catalyst component described above, wherein it is characterized in that the method comprises a step of supporting bismuth (Bi) on the zeolite, in the step, bismuth (Bi) being dissolved in a solvent, the solvent used being a compound having one or more alkoxy group and one or more hydroxy group per molecule, a compound having two or more hydroxy groups per molecule, or an acid.

The present invention also relates to a method for producing a catalyst for cleaning an exhaust gas comprising an inorganic fiber sheet having supported thereon an inorganic binder and zeolite, in which the method comprises a step of supporting bismuth (Bi) as a denitration catalyst component on the zeolite, in the step, bismuth (Bi) being dissolved in a solvent, the solvent used being a compound having one or more alkoxy group and one or more hydroxy group per molecule, a compound having two or more hydroxy groups per molecule, or an acid.

Advantageous Effects of Invention

According to the present invention, such an effect is provided that the use of the zeolite having the prescribed particle diameter described above provides a honeycomb structure that has a sufficiently high strength, ensures the use in a state with high endurance property against the external factors, such as vibration, and is excellent in durability.

Such an effect is also provided that the use of the honeycomb structure that has a sufficiently high strength, ensures the use in a state with high endurance property against the external factors, such as vibration, and is excellent in durability enhances the durability of a catalyst for cleaning an exhaust gas.

Furthermore, the increase of the amount of bismuth in the form of ion in the solvent increases the amount thereof that is ion-exchanged in the zeolite, and thereby bismuth is uniformly supported on the zeolite. As a result, a compound formed by bonding to SOx is prevented from being formed, and thereby the SOx durability is enhanced.

DESCRIPTION OF EMBODIMENT

Embodiments of the present invention will be described in detail below.

The honeycomb structure according to the present invention consists of a flat inorganic fiber sheet comprising an inorganic fiber sheet having supported thereon an inorganic binder and zeolite, and a corrugated inorganic fiber sheet comprising an inorganic fiber sheet having supported thereon the same inorganic binder and zeolite, which are alternately combined with each other, wherein it is characterized in that the zeolite has a particle diameter (i.e., a median particle diameter, D50) of from 0.5 to 10.0 µm, and preferably from 3.0 to 7.0 µm.

The particle diameter of the zeolite herein means a particle diameter corresponding to 50% in the volume-based cumulative particle size distribution (i.e., a median particle diameter, D50) measured by a laser diffraction method.

In the present invention, zeolite particles having a particle diameter (D50) of from 0.5 to 10.0 µm are used for ensuring the strength of the honeycomb structure. In the case where the zeolite particles have a large particle diameter exceeding the range described above, the contacts between the zeolite particles and the inorganic binders are decreased to make difficult the form retention. Zeolite particles having a small particle diameter that is less than the range described above are not practical due to the complexity in industrial production. The use of the zeolite particles having a particle diameter within the range described above increases the contacts to the inorganic binders, so as to ensure the strength suitable for the form retention.

The flat inorganic fiber sheet comprising an inorganic fiber sheet having supported thereon an inorganic binder and the zeolite, and the corrugated inorganic fiber sheet comprising an inorganic fiber sheet having supported thereon the same inorganic binder and the zeolite are alternately combined with each other, so as to produce a honeycomb structure.

For achieving the prescribed particle diameter (i.e., the median particle diameter, D50) of the zeolite, commercially available zeolite may be used after pulverizing.

In the present invention, the honeycomb structure means an integrated structure consisting of plural through holes (cells) partitioned with a partitioning wall, through which an exhaust gas is capable of passing, and the partitioning wall, and the cross sectional shape of the through holes described above (i.e., the cross sectional shape of the cells) is not particularly limited, examples of which include a circular shape, a circular arc shape, a square shape, a rectangular shape, and a hexagonal shape.

In the honeycomb structure described above, the inorganic fiber sheet is preferably a glass fiber sheet or a ceramic fiber sheet.

In the honeycomb structure described above, the inorganic binder is preferably formed of zirconia, alumina, silica, silica-alumina, or titania, and the inorganic binder is particularly preferably formed of zirconia or alumina.

Another denitration catalyst according to the present invention may be a catalyst for cleaning an exhaust gas (denitration catalyst) formed of small pieces of the substrate of the honeycomb structure (i.e., those formed only of the flat substrate or the corrugated substrate) or those in a pellet form.

When the small pieces of the substrate of the honeycomb structure have a corrugated form having one or more repeating concave grooves, they have small values for each of the width dimension per one of the concave groove (denoted by A), the repetition number in the width direction (denoted by n), the height dimension (denoted by B), and the depth dimension (denoted by C).

In the small pieces of the substrate of the honeycomb structure, the width dimension (A) is 2.0 mm or more, preferably 3.0 mm or more, and more preferably 4.0 mm or more. The width dimension (A) is preferably 100 mm or less, more preferably 50 mm or less, further preferably 25 mm or less, and still further preferably 10 mm or less.

The height dimension (B) is 1.0 mm or more, preferably 2.0 mm or more, and more preferably 3.0 mm or more. The height dimension (B) is preferably 50 mm or less, more preferably 25 mm or less, and further preferably 10 mm or less. The repetition number in the width direction (n) is from 1 to 100, preferably from 1 to 10, more preferably from 1 to 5, and further preferably from 2 to 4.

The depth dimension (C) is 3.0 mm or more, preferably 4.0 mm or more, and more preferably 5.0 mm or more. The depth dimension (C) is preferably 200 mm or less, more preferably 100 mm or less, further preferably 50.0 mm or less, still further preferably 20.0 mm or less, still further preferably 15.0 mm or less, and still further preferably 10.0 mm or less.

Preparation of Honeycomb Structure
Preparation of Substrate

The zeolite having the particular particle diameter described above, a solvent, and the inorganic binder are mixed to prepare a slurry. The slurry is coated on glass fiber paper as the inorganic fiber sheet.

The zeolite is preferably MFI zeolite or FER zeolite, and the zeolite used may also be MOR zeolite, BEA zeolite, or the like.

The inorganic binder used may be silica, titania, alumina, silica-alumina, zirconia, or the like.

In the case where silica is used as the inorganic binder, a silica sol used may be an acidic type containing approximately 20% by weight of silica (while neutral and basic types may also be used). The weight ratio of the zeolite, water, and silica sol as the inorganic binder may be controlled, for example, to 100/75/46.

Subsequently, the slurry described above is coated on a glass fiber sheet. Any known coating method may be used for coating, and examples thereof include a so-called dipping method, a brush coating method, a spray coating method, and a drop coating method.

Shaping of Substrate

The slurry-coated glass fiber sheet is then shaped with a corrugating mold and a pressing jig, the corrugated slurry-coated glass fiber sheet thus shaped is dried under condition of from 100 to 200° C. for from 1 to 2 hours and released from the mold, and separately the flat slurry-coated glass fiber sheet having not been shaped is dried under condition of from 100 to 200° C. for from 1 to 2 hours. At this time, the inorganic binder, such as a silica sol, added to the slurry functions as a binder between the glass fiber sheet and the zeolite, so as to enable retention of the corrugated form after shaping the glass fiber sheet.

The corrugated slurry-coated glass fiber sheet and the flat slurry-coated glass fiber sheet are calcined under condition of from 300 to 550° C. for from 1 to 4 hours.

The corrugated glass fiber sheet substrate and the flat glass fiber sheet substrate thus obtained are then laminated alternately to provide the honeycomb structure.

The honeycomb structure according to the present invention consists of a flat glass fiber sheet comprising an inorganic fiber sheet having supported thereon an inorganic binder and zeolite, and a corrugated glass fiber sheet comprising an inorganic fiber sheet having supported thereon the same inorganic binder and zeolite, which are alternately combined with each other, wherein it is characterized in that the zeolite has a particle diameter (i.e., a median particle diameter, D50) of from 0.5 to 10.0 μm. According to the present invention, the use of the zeolite having the particular particle diameter described above can provide a honeycomb structure that has a sufficiently high strength, ensures the use in a state with high endurance property against the external factors, such as vibration, and is excellent in durability.

The catalyst for cleaning an exhaust gas according to the present invention is characterized in that it contains a denitration catalyst component that is supported on the zeolite of the aforementioned honeycomb structure.

In the catalyst for cleaning an exhaust gas using the aforementioned honeycomb structure, the inorganic binder is preferably zirconia or alumina.

The catalyst for cleaning an exhaust gas preferably contains, as the denitration catalyst component, a metallic element consisting of bismuth (Bi) on the zeolite.

The precursor compound of the metallic element to be supported may be an inorganic acid salt (such as nitrate and chloride) or an organic acid salt (such as acetate). Any supporting method for the catalyst metal may be used as far as the denitration capability is exhibited, and examples thereof include an ion exchange method and an impregnation supporting method. Examples of the ion exchange method include such a method that zeolite is suspended in an aqueous solution containing a precursor compound of bismuth (Bi), and the zeolite having the catalyst metal bonded thereto through ion exchange is taken out from the aqueous solution, dried, and then calcined.

In the case where a metallic element consisting of bismuth (Bi) is to be supported as the denitration catalyst component on the zeolite, the precursor compound of the metallic element to be supported may be an inorganic acid salt (such as nitrate and chloride), an organic acid salt (such as acetate), or an oxide. Any supporting method for the catalyst metal may be used as far as the denitration capability is exhibited, and examples thereof include an ion exchange method and an impregnation supporting method. Examples of the ion exchange method include such a method that zeolite having the catalyst metal bonded thereto through ion exchange is taken out from the solvent, dried, and then calcined.

Examples of the solvent for dissolving the aforementioned precursor compound of bismuth include a compound having one or more alkoxy group and one or more hydroxy group per molecule, and a compound having two or more hydroxy groups per molecule, and an acid.

The compound having one or more alkoxy group and one or more hydroxy group per molecule used is preferably 2-methoxyethanol. The compound having two or more hydroxy groups per molecule used is preferably ethylene glycol. The acid used is preferably nitric acid or acetic acid.

In the denitration catalyst according to the present invention, a compound having one or more alkoxy group and one or more hydroxy group per molecule, a compound having two or more hydroxy groups per molecule, such as a diol compound, or an acid is used as the solvent, and thus it has such a feature that bismuth is present in the form of ion in the catalyst slurry. According to the present invention, bismuth is uniformly supported on the zeolite.

According to the catalyst for cleaning an exhaust gas using the honeycomb structure of the present invention, the use of the zeolite having the particular particle diameter described above can provide the catalyst for cleaning an exhaust gas using the honeycomb structure that has a sufficiently high strength, ensures the use in a state with high endurance property against the external factors, such as vibration, and is excellent in durability.

According to the catalyst for cleaning an exhaust gas of the present invention having zirconia or alumina as the inorganic binder, in particular, a nitrogen oxide can be effectively decreased from a combustion exhaust gas having a high concentration of a nitrogen oxide (NOx) and a sulfur oxide (SOx) present therein, and having a low exhaust gas temperature of 300° C. or less, discharged, for example, from a marine vessel engine, i.e., a large marine vessel diesel engine, a large scale boiler for a factory, an electric power plant, a community central heating and air-conditioning plant, and the like.

In the case where the aforementioned bismuth compound is supported on the zeolite, while the step of supporting may be performed as a separate step after producing the honeycomb structure from glass paper, the step of supporting may be performed in the course of from the glass paper to the honeycomb structure, or may be performed simultaneously with the preparation of the substrate of the honeycomb structure by mixing the aforementioned bismuth solution with the slurry formed of the zeolite, the solvent, and the inorganic binder.

In the catalyst for cleaning a combustion exhaust gas according to the present invention, the reducing agent is not particularly limited as far as it has a reducing power at the temperature where the combustion exhaust gas is reduced, and methanol or ethanol, as an alcohol having a small number of carbon, is preferably used.

EXAMPLE

Examples of the present invention will be described below with comparative examples, but the present invention is not limited to the examples.

Example 1

FER zeolite having a particle diameter (D50) of 7.0 μm (CP914C, a trade name, produced by Zeolyst International) was used, and 25 g of the zeolite, 18.75 g of ion exchanged water, and 11.5 g of an aqueous solution of a silica sol (solid concentration: 22.0% by weight) as an inorganic binder were mixed to provide a slurry. 18 g of the slurry was coated on glass paper of 100 mm×150 mm to provide flat slurry-coated glass paper, and then the flat slurry-coated glass paper was dried at 110° C. for 1 hour. Separately, 27.6 g of the slurry described above was coated on glass paper of 100 mm×230 mm, the slurry-coated glass paper was shaped with a corrugating mold and a pressing jig, the corrugated slurry-coated glass paper thus shaped is dried at 110° C. for 1 hour, and released from the mold. Thereafter, the flat slurry-coated glass paper and the corrugated slurry-coated glass paper were calcined at a temperature of 500° C. for 3 hours. Two plies of the flat silica sol-zeolite-supported glass paper and one ply of the corrugated silica sol-zeolite-supported glass paper were combined alternately, thereby producing a honeycomb structure.

The particle diameter of the zeolite herein is a particle diameter corresponding to 50% in the volume-based cumulative particle size distribution (i.e., a median particle diameter, D50) measured by a laser diffraction method, and the particle diameter (D50) of the zeolite was measured with a laser diffraction and scattering particle size analyzer (Microtrac MT3300EXII, a trade name, produced by Nikkiso Co., Ltd.).

Example 2

A honeycomb structure according to the present invention was produced in the same manner as in Example 1 described above provided that the difference from Example 1 described above was that FER zeolite having a particle diameter (D50) of 3.0 μm was used.

Example 3

A honeycomb structure according to the present invention was produced in the same manner as in Example 1 described above provided that the difference from Example 1 described above was that MFI zeolite having a particle diameter (D50) of 6.0 μm was used.

Comparative Example 1

For comparison, a honeycomb structure was produced in the same manner as in Example 1 described above provided that the difference from Example 1 described above was that FER zeolite having a particle diameter (D50) of 36.0 μm was used.

Comparative Example 2

For comparison, a honeycomb structure was produced in the same manner as in Example 1 described above provided that the difference from Example 1 described above was that FER zeolite having a particle diameter (D50) of 14.0 μm was used.

Evaluation of Strength

The honeycomb structures obtained in Examples 1 to 3 according to the present invention and Comparative Examples 1 and 2 were evaluated by visually observing for the strength of the honeycomb structures, and the results obtained are shown in Table 1 below. The evaluation standard is as follows.

Observation of Strength of Honeycomb Structure

A: The silica sol-zeolite-supported glass paper can be corrugated, and in the production of the honeycomb structure by combining alternately the corrugated silica sol-zeolite-supported glass paper and the flat silica sol-zeolite-supported glass paper, the corrugated form of the corrugated silica sol-zeolite-supported glass paper is not broken to retain the strength.

B: The silica sol-zeolite-supported glass paper can be corrugated, but in the production of the honeycomb structure by combining alternately the corrugated silica sol-zeolite-supported glass paper and the flat silica sol-zeolite-supported glass paper, the corrugated form of the corrugated silica sol-zeolite-supported glass paper cannot be retained to break the honeycomb structure.

C: The silica sol-zeolite-supported glass paper cannot be corrugated, and no honeycomb structure can be produced.

TABLE 1

| | Particle diameter (D50) (μm) | Strength of honeycomb structure |
|---|---|---|
| Example 1 | 7 | A |
| Example 2 | 3 | A |
| Example 3 | 6 | A |
| Comparative Example 1 | 36 | C |
| Comparative Example 2 | 14 | B |

As apparent from the results shown in Table 1 described above, according to the honeycomb structures of Examples 1 to 3 according to the present invention, a honeycomb structure that has a sufficiently high strength, ensures the use in a state with high endurance property against the external factors, such as vibration, and is excellent in durability can be obtained by using zeolite having the particular particle diameter. In Comparative Examples 1 and 2, on the other hand, it is understood that due to the large particle diameters (D50) of the zeolite exceeding the range of from 0.5 to 10.0 μm, the contacts between the zeolite particles and the inorganic binder are decreased, and thus in the production of the honeycomb structure by alternately combining the corrugated silica sol-zeolite-supported glass paper and the flat silica sol-zeolite-supported glass paper, the form of the corrugated silica sol-zeolite-supported glass paper is not retained, resulting in breakage of the honeycomb structure, or the silica sol-zeolite-supported glass paper cannot be corrugated, resulting in failure in production of the honeycomb structure.

Example 4

A denitration catalyst for cleaning an exhaust gas using a honeycomb structure according to the present invention was produced in the following manner.

FER zeolite having a particle diameter (D50) of 7.0 μm (CP914C, a trade name, produced by Zeolyst International) was used, and 20 g of the zeolite, 9.2 g of a zirconia sol (Zircosol 20A, a trade name, produced by Daiichi Kigenso Kagaku Kogyo Co., Ltd.) as an inorganic binder, 2.65 g of bismuth nitrate (Bismuth(III) Nitrate Pentahydrate, a trade name, produced by Kishida Chemical Co., Ltd.), and 20 g of ion exchanged water were mixed and agitated at room temperature for 1 hour to provide a slurry having a solid concentration of 46.8% by weight. The slurry was coated on glass paper of 100 mm×150 mm to provide flat slurry-coated glass paper, and then the flat slurry-coated glass paper was dried at 110° C. for 1 hour. Separately, the slurry described above was coated on glass paper of 100 mm×230 mm, the slurry-coated glass paper was shaped with a corrugating mold and a pressing jig, the corrugated slurry-coated glass paper thus shaped is dried at 110° C. for 1 hour, and released from the mold. Thereafter, the flat slurry-coated glass paper and the corrugated slurry-coated glass paper were calcined at a temperature of 500° C. for 3 hours, thereby providing flat glass paper having supported thereon the zeolite, bismuth (Bi) as the denitration catalyst metal, and the zirconium compound as the shape maintaining binder, and corrugated glass paper having supported thereon the same materials. Two plies of the flat catalyst-supported glass paper and one ply of the corrugated catalyst-supported glass paper were combined alternately, thereby producing a denitration catalyst for cleaning a combustion exhaust gas using the honeycomb structure.

Example 5

A denitration catalyst for cleaning a combustion exhaust gas using a honeycomb structure according to the present invention was produced in the same manner as in Example 4 described above provided that the difference from Example 4 described above was that an aqueous solution containing an alumina sol (Aluminasol 520, a trade name, produced by Nissan Chemical Industries, Ltd.) as the inorganic binder was used instead of the zirconia sol (Zircosol 20A) as the inorganic binder.

Reference Example 1

A denitration catalyst for cleaning a combustion exhaust gas using a honeycomb structure according to the present invention was produced in the same manner as in Example 4 described above provided that the difference from Example 4 described above was that an aqueous solution containing a silica sol (Silicadol 20A, a trade name, produced by Nippon Chemical Industrial Co., Ltd.) as the inorganic binder was used instead of the zirconia sol (Zircosol 20A) as the inorganic binder.

Reference Example 2

A denitration catalyst for cleaning a combustion exhaust gas using a honeycomb structure according to the present invention was produced in the same manner as in Example 4 described above provided that the difference from Example 4 described above was that an aqueous solution containing a titania sol (Titaniasol S-300A, a trade name, produced by Millennium Inorganic Chemicals, Inc.) as the inorganic binder was used instead of the zirconia sol (Zircosol 20A) as the inorganic binder.

Evaluation of Strength

The honeycomb structures obtained in Examples 4 and 5 according to the present invention and Reference Examples 1 and 2 were evaluated by visually observing for the strength of the honeycomb structures based on the aforementioned evaluation standard, and the results obtained are shown in Table 4 below.

Evaluation of Denitration Capability

Figure 1:
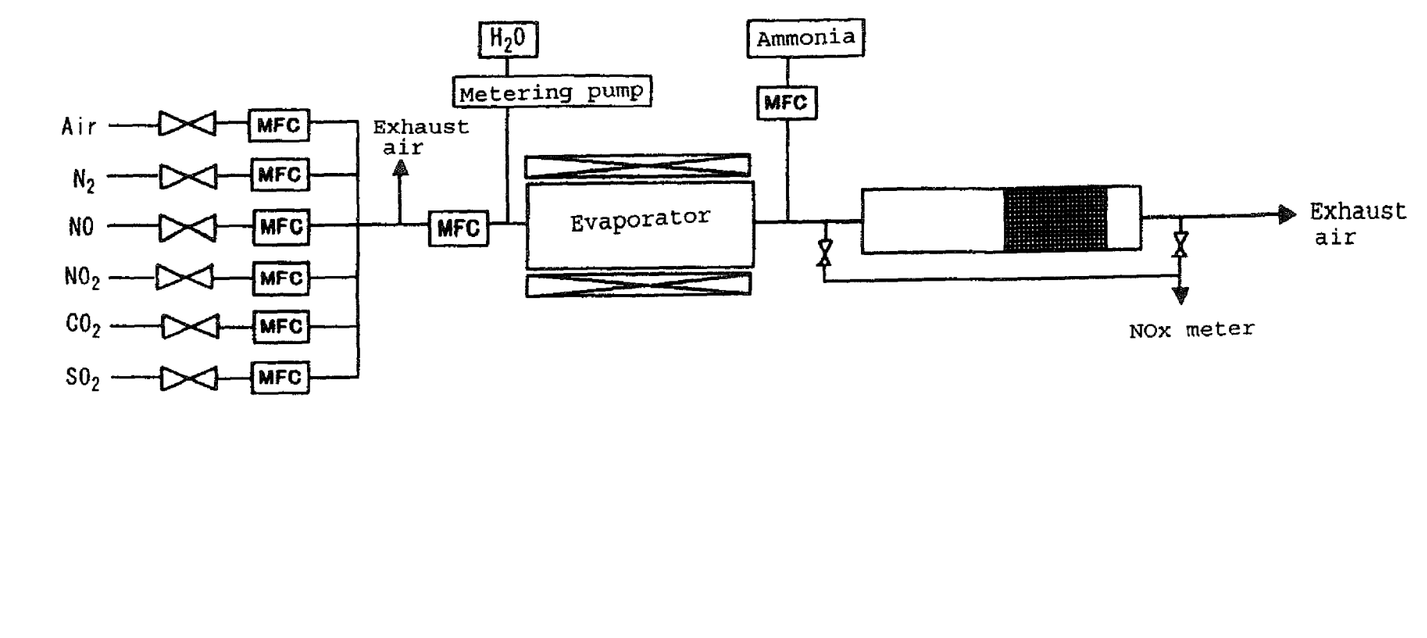
FIG. 1 is a flow chart showing one example of a denitration rate measuring instrument used in the catalyst capability test in the example of the present invention.

The denitration catalysts for cleaning a combustion exhaust gas using the honeycomb structures obtained in Examples 4 and 5 according to the present invention and Reference Examples 1 and 2 were subjected to a capability evaluation test. FIG. 1 shows a flow chart of a capability evaluation test instrument for a denitration catalyst.

In the test instrument shown in FIG. 1, the denitration catalyst for cleaning a combustion exhaust gas using the honeycomb structure was charged in a denitration reactor formed of a stainless steel reaction tube, and subjected to a capability evaluation test for an exhaust gas having an NO concentration of 1,000 ppm under the test condition shown in Table 2 below using methanol as a reducing agent in a concentration of 1,800 ppm.

TABLE 2

Denitration capability evaluation test condition

| | |
|---|---|
| Gas composition: NO | 1,000 ppmvd |
| Gas composition: air | balance |
| Reducing agent: methanol | 1,800 ppmvd |
| Water content | 5% by volume |
| Space velocity (SV) | 7,440 |
| Reaction temperature | 250° C. |

The gas at the outlet port of the denitration reactor was measured for the concentration of nitrogen oxide (NOx) at the outlet port with an NOx meter. The denitration rate as the NOx removal capability of the catalyst was calculated from the measured value with the NOx meter according to the following expression (1).

$$\text{Denitration rate (\%)} = (NOxin - NOxout)/NOxin \times 100 \quad (1)$$

The results of the evaluation test of the denitration catalyst capability thus obtained are shown in Table 4 below.

Evaluation of SOx Durability

In order to confirm that the denitration catalysts for cleaning a combustion exhaust gas using the honeycomb structures obtained in Examples 4 and 5 according to the present invention and Reference Examples 1 and 2 were able to decrease effectively a nitrogen oxide even in the presence of a sulfur oxide (SOx) in a high concentration, the denitration catalysts were tested for the durability to sulfur trioxide as a sulfur oxide (SOx).

A durability test was performed in such a manner that the denitration catalysts for cleaning a combustion exhaust gas using the honeycomb structures obtained in Examples 4 and 5 according to the present invention and Reference Examples 1 and 2 were exposed to a gas containing sulfur oxides ($SO_2$ and $SO_3$) for 6 hours under the condition shown in Table 3 below. The sulfur oxides ($SO_2$ and $SO_3$) were sent to the evaporator with a metering pump, and then fed to the reaction tube after gasification in the evaporator.

TABLE 3 condition of SOx exposure test

| | |
|---|---|
| Gas composition: $SO_2$ | 540 ppmvd |
| Gas composition: $SO_3$ | 60 ppmvd |
| Gas composition: air | balance |
| Space velocity (SV) | 7,440 |
| Gas temperature | 250° C. |
| Exposure time | 6 hours |

The capability evaluation test corresponding to the cleaning method of a combustion exhaust gas was performed in the same manner as above by using the denitration catalysts after exposing to sulfur oxides ($SO_2$ and $SO_3$). The results of the evaluation test of the denitration catalyst capability thus obtained are shown in Table 4 below.

Evaluation of Strength

For the denitration catalysts for cleaning a combustion exhaust gas using the honeycomb structures obtained in Examples 4 and 5 according to the present invention and Reference Examples 1 and 2, the denitration catalysts for cleaning a combustion exhaust gas using the honeycomb structures after subjecting to the denitration capability evaluation test were visually observed, and the results obtained are shown in Table 4 below.

Observation of Strength of Denitration Catalyst for Cleaning Combustion Exhaust Gas Using Honeycomb Structure A: The corrugated form of the honeycomb structure after the capability evaluation test was normally retained.

B: The corrugated form of the honeycomb structure after the capability evaluation test was slightly broken.

TABLE 4

Denitration capability

| | Denitration rate before SOx exposure (%) | Denitration rate after SOx exposure (%) | Denitration capability retention rate (%) | Evaluation of strength |
|---|---|---|---|---|
| Example 4 | 75 | 73 | 97.3 | A |
| Example 5 | 84 | 68 | 81.0 | A |
| Comparative Example 1 | 85 | 35 | 41.2 | B |
| Comparative Example 2 | 70 | 40 | 57.1 | B |

As apparent from the results shown in Table 4 described above, according to the denitration catalysts using the honeycomb structures of Examples 4 and 5 according to the present invention, 80% or more of the denitration capability before exposing to sulfur oxides ($SO_2$ and $SO_3$) was retained even after exposing to sulfur oxides ($SO_2$ and $SO_3$), and thus it was confirmed that the denitration catalyst using the honeycomb structure according to the present invention was effective for the sulfur oxide (SOx) durability. It was also confirmed that the addition of a zirconium compound and aluminum oxide was particularly effective for enhancing the sulfur oxide (SOx) durability and the catalyst strength.

According to the catalyst for cleaning an exhaust gas using the honeycomb structure according to the present invention, a nitrogen oxide can be effectively decreased from a combustion exhaust gas having a high concentration of a nitrogen oxide (NOx) and a sulfur oxide (SOx) present therein, and having a low exhaust gas temperature of 300° C. or less, discharged, for example, from a marine vessel engine, i.e., a large marine vessel diesel engine, a large scale boiler for a factory, an electric power plant, a community central heating and air-conditioning plant, and the like.

Example 6

Bismuth nitrate (Bismuth(III) Nitrate Pentahydrate, a trade name, produced by Kishida Chemical Co., Ltd.) was dissolved in ethylene glycol (Ethylene Glycol, a trade name, produced by Kishida Chemical Co., Ltd.), to which FER zeolite having a particle diameter (D50) of 7.0 µm (CP914C, a trade name, produced by Zeolyst International) was added to provide a slurry. The slurry was agitated at 60° C. for 3 hours, and after cooling to room temperature, a zirconia sol (Zircosol AC-20, a trade name, produced by Daiichi Kigenso Kagaku Kogyo Co., Ltd.) as an inorganic binder was added thereto. 18 g of the catalyst slurry was coated on glass fiber paper cut into 100 mm×150 mm to provide flat slurry-coated glass paper, and then the flat slurry-coated glass paper was dried at 110° C. for 1 hour. Separately, 27.6 g of the slurry described above was coated on glass paper of 100 mm×230 mm, the slurry-coated glass paper was shaped with a corrugating mold and a pressing jig, the corrugated slurry-coated glass paper thus shaped is dried at 110° C. for 1 hour, and released from the mold. Thereafter, the flat slurry-coated glass paper and the corrugated slurry-coated glass paper were calcined at 500° C. for 3 hours. The flat glass paper and the corrugated glass paper were combined alternately, thereby producing a honeycomb structure.

Reference Example 3

A denitration catalyst for cleaning a combustion exhaust gas using a honeycomb structure according to the present invention was produced in the same manner as in Example 6 provided that the difference from Example 6 described above was that ion exchanged water was used instead of ethylene glycol.

Evaluation of Dispersibility

The supported amounts of bismuth on the both surfaces of the flat glass fiber sheets of the honeycomb structures obtained in Example 6 according to the present invention and Reference Example 3 were measured with a fluorescent X-ray analyzer, and the results obtained are shown in Table 5 below.

TABLE 5

Results of measurement of surface bismuth amount (% by weight)

|  | Example 6 | Reference Example 3 |
|---|---|---|
| Front surface | 5.14 | 2.70 |
| Back surface | 5.48 | 4.78 |

As apparent from the results shown in Table 5 described above, according to the denitration catalyst using the honeycomb structure of Example 6 according to the present invention, such a substrate of a honeycomb structure is obtained that has the amount of bismuth as the denitration catalyst component that is uniformly supported on both the front surface and the back surface thereof.

As shown in Table 5 described above, furthermore, it was verified that the surface bismuth amount was larger in Example 6 than Reference Example 3 on both the front surface and the back surface thereof.

Evaluation of SOx Durability

For the denitration catalysts for cleaning a combustion exhaust gas using the honeycomb structures of Example 6 according to the present invention and Reference Example 3, they were subjected to a denitration capability evaluation test under the condition shown in Table 6, and then tested for the durability to a sulfur oxide (SOx) for 250 hours under the condition shown in Table 7. Thereafter, the denitration catalysts after exposing to sulfur oxides ($SO_2$ and $SO_3$) were again subjected to a denitration capability evaluation test under the condition shown in Table 6.

TABLE 6

Condition of denitration capability evaluation test

| Gas composition: NO | 1,000 ppmvd |
|---|---|
| Gas composition: air | balance |
| Water content | 6% by volume |
| $O_2$ concentration | 14% by volume |
| Reducing agent: methanol | 1,800 ppmvd |
| Reaction temperature | 250° C. |

TABLE 7 condition of SOx exposure test

| Gas composition: NO | 1,000 ppmvd |
|---|---|
| Gas composition: air | balance |
| Water content | 6% by volume |
| $SO_2$ concentration | 17 ppmvd |
| $SO_3$ concentration | 3 ppmvd |
| $O_2$ concentration | 14% by volume |
| Reducing agent: methanol | 1,800 ppmvd |
| Reaction temperature | 250° C. |

TABLE 8

Results of measurement of denitration rate

|  | Initial denitration rate (%) | Denitration rate after durability test (%) | Denitration capability retention rate (%) |
|---|---|---|---|
| Example 6 | 74 | 50 | 67.6 |
| Reference Example 3 | 74 | 44 | 59.5 |

The followings are apparent from the results shown in Tables 5 and 8 described above. Bismuth nitrate is substantially not dissolved in water, and thus the ion exchange rate is low. In the case where bismuth is tried to dissolve in an aqueous solution, bismuth that is not ion-exchanged is accumulated on the back surface due to the heavy weight rather than zeolite in the preparation of the catalyst, and is incorporated as a catalyst. Accordingly, the denitration catalyst that is produced by trying to dissolve bismuth in an aqueous solution is liable to be reacted with SOx and has low durability. Accordingly, the significant differences are exhibited in the denitration rate after the durability test and the denitration capability retention rate although the initial denitration rates are equivalent to each other. It was verified that the use of ethylene glycol as a solvent for dissolving bismuth as in Example 6 provided excellent durability.

The invention claimed is:

1. A method for producing a catalyst for cleaning an exhaust gas using a honeycomb structure,
wherein the honeycomb structure consists of
a flat inorganic fiber sheet comprising an inorganic fiber sheet having supported thereon an inorganic binder and zeolite and
a corrugated inorganic fiber sheet comprising an inorganic fiber sheet having supported thereon the same inorganic binder and zeolite,
which are alternately combined with each other; and
the zeolite has a median particle diameter of from 0.5 to 10.0 μm;
wherein the catalyst comprises a denitration catalyst component that is supported on the zeolite of the honeycomb structure;
wherein the denitration catalyst component is bismuth; and
wherein the method comprises
a step of supporting bismuth (Bi) on the zeolite by an ion exchange method,
in the step, bismuth (Bi) being dissolved in a solvent, the solvent is a compound having one or more alkoxy group and one or more hydroxy group per molecule, a compound having two or more hydroxy groups per molecule, or an acid.

2. A method for producing the catalyst for cleaning an exhaust gas according to claim 1,
wherein the inorganic fiber sheet is a glass fiber sheet.

3. A method for producing the catalyst for cleaning an exhaust gas according to claim 1,
wherein an inorganic acid salt or an organic acid salt is used as a precursor compound of bismuth being supported on the zeolite.

4. A method for producing the catalyst for cleaning an exhaust gas according to claim 3,
wherein the inorganic salt is nitrate or chloride.

5. A method for producing the catalyst for cleaning an exhaust gas according to claim 3,
wherein an organic acid salt is acetate.

6. A method for producing the catalyst for cleaning an exhaust gas according to claim 1,
   wherein the solvent is a compound having two or more hydroxy groups per molecule.

7. A method for producing the catalyst for cleaning an exhaust gas according to claim 6,
   wherein the compound having two or more hydroxy groups per molecule is a diol compound.

8. A method for producing the catalyst for cleaning an exhaust gas according to claim 7,
   wherein the diol compound is ethylene glycol.

9. A method for producing the catalyst for cleaning an exhaust gas according to claim 1,
   wherein the method further comprises:
   a step of providing a slurry of bismuth and zeolite,
   agitating the slurry of bismuth and zeolite with heating followed by cooling to room temperature,
   adding an inorganic binder to the slurry to form a catalyst slurry, and
   coating an inorganic fiber sheet with the catalyst slurry.

10. The method for producing a catalyst for cleaning an exhaust gas using a honeycomb structure according to claim 9, wherein the slurry is agitated at 60° C. for three hours.

11. The method for producing a catalyst for cleaning an exhaust gas using a honeycomb structure according to claim 9, wherein the inorganic binder is zirconia.

\* \* \* \* \*